(12) United States Patent
Rodgers, II

(10) Patent No.: US 7,597,644 B2
(45) Date of Patent: Oct. 6, 2009

(54) NINE OR TEN SPEED SPLIT CLUTCH COUNTERSHAFT AUTOMATIC TRANSMISSION

(75) Inventor: Dane L. Rodgers, II, Avon, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 319 days.

(21) Appl. No.: 11/751,199

(22) Filed: May 21, 2007

(65) Prior Publication Data

US 2008/0293533 A1 Nov. 27, 2008

(51) Int. Cl.
*F16H 37/04* (2006.01)
*F16H 3/00* (2006.01)
(52) U.S. Cl. ............... 475/218; 475/302; 74/325
(58) Field of Classification Search .......... 74/664, 74/665 A, 665 D, 665 E, 329, 340; 475/207, 475/218, 302, 317, 320, 329
See application file for complete search history.

(56) References Cited

U.S. PATENT DOCUMENTS

| 5,445,041 | A | * | 8/1995 | Zaiser et al. | 74/331 |
| 7,437,963 | B2 | * | 10/2008 | Haka et al. | 74/329 |
| 2007/0068294 | A1 | * | 3/2007 | Buck et al. | 74/325 |
| 2007/0266810 | A1 | * | 11/2007 | Forsyth | 74/331 |
| 2008/0000311 | A1 | * | 1/2008 | Baldwin | 74/331 |
| 2008/0182700 | A1 | * | 7/2008 | Earhart | 475/207 |

* cited by examiner

*Primary Examiner*—Sherry L Estremsky
*Assistant Examiner*—Edwin A. Young

(57) ABSTRACT

A combination countershaft and planetary gear set transmission is provided that achieves at least nine forward speed ratios and two reverse speed ratios. The transmission includes a main shaft operatively driven by a transmission input member as well as first and second countershafts with each countershaft spaced apart from and substantially parallel to the main shaft. The countershafts utilize a split clutch arrangement in which one of the clutches is cantilevered off the countershaft, allowing the size of the countershaft as well as an intermediate support plate to be removed, reducing parts complexity, material and overall length of the transmission.

20 Claims, 4 Drawing Sheets

| Range | Torque Ratio | Ratio Step | C1 | C2 | C3 | C4 | C5 | C6 | C7 | CD |
|---|---|---|---|---|---|---|---|---|---|---|
| Rev H | -2.1896 | | | | X | | | | X | DR |
| Rev L | -7.5072 | -1.0058 | | | X | | | X | | DR |
| 1 | 7.4640 | | X | | | | | X | | O |
| 2 | 5.3449 | 1.3964 | | X | | | | X | | O |
| 3 | 3.9038 | 1.3692 | | | X | | | X | | DF |
| 4 | 2.9158 | 1.3388 | | | | | X | X | | O |
| 5 | 2.1770 | 1.3394 | X | | | | | | X | O |
| 6 | 1.5589 | 1.3964 | | X | | | | | X | O |
| 7 | 1.1386 | 1.3692 | | | X | | | | X | DF |
| 8 | 1.0000 | 1.1386 | | | | X | | | X | O |
| 9 | 0.8504 | 1.1759 | | | | | X | | X | O |
| TRC | 8.7770 | | | | | | | | | |

X = Engaged
DF = Dog clutch in forward position
DF = Dog clutch in reverse position
O = Dog clutch in either forward or reverse positions

FIG. 2

NINE OR TEN SPEED SPLIT CLUTCH COUNTERSHAFT AUTOMATIC TRANSMISSION

TECHNICAL FIELD

The present invention relates to an automatic multi-speed transmission having first and second countershafts and a planetary gear set.

BACKGROUND OF THE INVENTION

Motor vehicle powertrains typically include a transmission interposed between the engine and the differential providing torque to the vehicle's driven wheels. Transmissions provide a manual or automated selection of speed ratios between the speed of rotation of the transmission input shaft and the rotation speed of the output shaft resulting in output torque multiplication or reduction with the goal of matching vehicle on-ground torque and speed demands to the engine's output speed and torque capabilities while maintaining engine operating parameters within optimum fuel efficiency and emission ranges.

A variety of different types of transmissions are used to deliver multiple speed ratios including manual, automated manual, dual clutch, continuously variable transmissions and various types of planetary transmissions. One example type of transmission is a dual clutch transmission which utilizes two friction clutches along with dog clutches and synchronizers to achieve dynamic speed and torque ratio shifts by alternating between one friction clutch and the other and several dog clutch/synchronizers where the synchronizers are preset for the oncoming ratio to actually make the dynamic speed/torque ratio shift.

Early motor vehicle transmissions typically provided two, three or maybe four forward speed ranges. In the interest of increasing fuel economy the number of forward speed ranges has tended to increase in recent years with the advantage of permitting the engine to operate within a desired fuel efficient optimum engine speed and torque range relatively independent of vehicle ground speed conditions.

Vehicle fuel economy and production/retail cost is further impacted by vehicle parts complexity and component weight/material considerations, including transmission parts complexity, size and weight.

SUMMARY OF THE INVENTION

A combination countershaft and planetary gear set transmission is provided that achieves ten forward speed ratios (nine in a preferred embodiment) and two reverse speed ratios while reducing parts complexity, materials usage and transmission size. The transmission includes input member as well as first and second countershafts with each countershaft arranged generally parallel to the input and output members. The transmission includes a first and a second head gear set where each head gear set is configured as a set of coplanar intermeshing gears configured to transfer rotary motion and torque from the input member to the countershafts. The transmission includes a plurality of torque transmitting mechanisms consisting of a first and a second rotary clutch spaced apart from one another on the first countershaft; a third and a fourth rotary clutch spaced apart from one another on the second countershaft; a dog clutch; and three additional torque transmitting mechanisms. The transmission further includes a plurality of intermeshing gears arranged on the input member, the first countershaft and the second countershaft to define five gear planes. A planetary gear set is included and operatively connecting the input member and the countershafts with the output member via selected ones of the torque transmitting mechanisms. The rotary clutches, torque transmitting mechanisms and dog clutch are selectively engageable in different combinations to establish at least nine forward speed ratios and at least one reverse speed ratio between the input member and the output member, wherein the forward ratios utilize gears in only four of the five gear planes.

In another aspect of the invention, each countershaft has at least one of its rotary clutches supported in a cantilevered fashion by one of the bearings supporting end portions of the countershaft and positioned away from the span of the countershaft.

In another aspect of the invention, the transmission is characterized by each countershaft having no more than one support plate.

In another aspect of the invention, the plurality of intermeshing gears includes a first head gear set of coplanar intermeshing gears for transferring torque from the input member to the first countershaft; wherein the first head gear set has one gear concentric with and driveably coupled to the first countershaft and wherein the first head gear set has a different gear concentric with and driveably coupled to the input member. Similarly, the plurality of intermeshing gears includes a second head gear set of coplanar intermeshing gears for transferring torque from the input member to the second countershaft; wherein the second head gear set has one gear concentric with and driveably coupled to the second countershaft and the second head gear set has a different gear concentric with and driveably coupled to the input member.

In yet another aspect of the invention, the first countershaft has two intermeshing gears concentric with and rotatable about the first countershaft. The dog clutch is concentric with and supported for rotation about the first countershaft with the dog clutch selectively moveable between opposing forward and reverse positions. The dog clutch selectively and driveably couples the first rotary clutch to one of the two first countershaft gears when the dog clutch is in the forward position to at least partially enable at least one forward speed ratio. The second rotary clutch is selectively engageable to driveably couple the first countershaft to a different one of the two first countershaft gears to at least partially enable to at least partially enable at least one forward speed ratio. In this aspect of the invention, one of the intermeshing gears is a first reverse gear concentric with and rotatable about the first countershaft. The reverse position of the dog clutch driveably couples the first rotary clutch to the first reverse gear to at least partially enable at least one reverse speed ratio.

In a further aspect of the invention, one of the rotary clutches and one of the head gear sets define one of the gear planes.

In another aspect of the invention, the second countershaft has two of the plurality of intermeshing gears concentric with and rotatable about the second countershaft. The third rotary clutch is selectively engageable to driveably couple the second countershaft to one of the second countershaft gears to at least partially enable to at least partially enable at least one forward speed ratio. The fourth rotary clutch is selectively engageable to driveably couple the second countershaft to a different one of the second countershaft gears to at least partially enable at least one forward speed ratio.

In yet another aspect of the invention, a second reverse gear continuously meshably engages the first reverse gear. A third reverse gear is continuously and non-meshably coupled for common rotation with the second reverse gear, the third gear continuously meshably engaging a portion of a fourth gear concentric with and rotatable about the input member and driveably coupled to at least partially enable at least one reverse speed ratio. The first and second reverse gears at least partially define one of the five gear planes.

In another aspect of the invention, the planetary gear set includes a ring gear member, a carrier member and a sun gear member. One of the torque transmitting mechanisms is a brake clutch selectively engageable to ground the ring gear member to provide a reaction point to the planetary gear set.

In another aspect of the invention, one of the torque transmitting mechanisms is a lock-up clutch selectively engageable to torsionally couple for common rotation two of the members of the planetary gear set.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 presents an engagement schedule or truth table for the torque transmitting mechanisms to achieve the nine forward ranges and two reverse ranges in accordance with the present invention;

DESCRIPTION OF THE PREFERRED EMBODIMENTS

Figure 1:
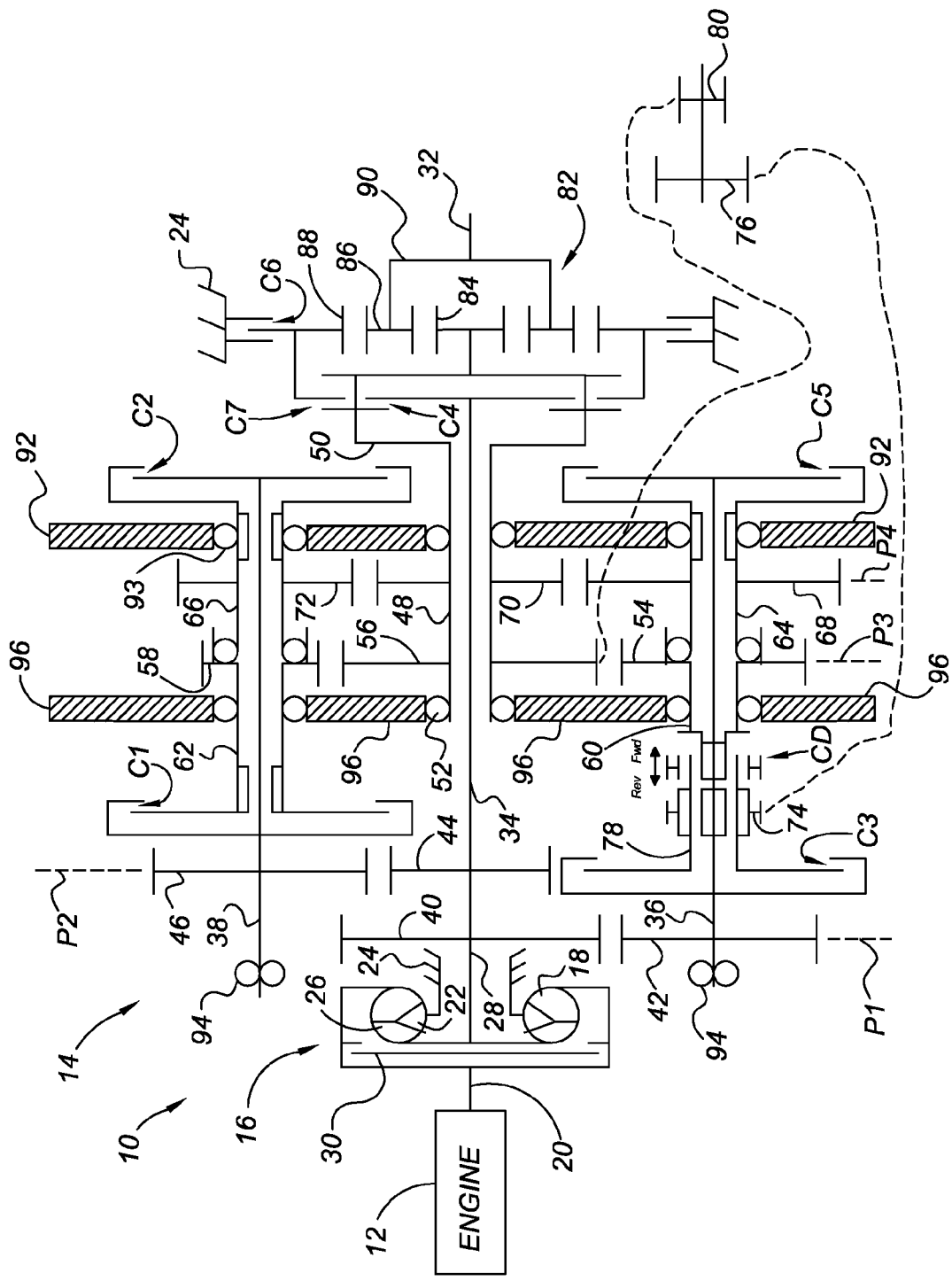
FIG. 1 illustrates a first embodiment of a transmission having 9 or 10 forward ranges and two reverse ranges in accordance with the present invention.

Referring to the drawings where like reference numbers refer to like components. FIG. 1 illustrates a powertrain 10 that includes an engine 12 operatively and torsionally coupled to the transmission 14 through a torque converter 16. The torque converter 16 includes a pump portion 18 coupled for rotation with output shaft 20 of engine 12 and a turbine portion 26. A stator portion 22 of the pump portion 18 is grounded to a stationary member such as transmission housing or casing 24. As understood by those skilled in the art, the torque converter 16 is a torque coupling device using fluid delivered by the pump portion 18 to transfer torque and rotary motion to the turbine portion 26. The turbine portion 26 is connected for rotation with an input member 28 of the transmission 14. To improve fuel economy the torque converter 16 includes a lockup clutch 30 selectively operable to lock the rotation of the pump portion 18 to the turbine portion 26. When the lockup clutch 30 is engaged, the power flow from the output shaft 20 of the engine 12 is directly coupled to the input member 28 thereby bypassing the torque converter 16.

Transmission 14 is operable to provide preferably nine and as many as ten forward speed ratios as well as two reverse speed ratios between transmission input member 28 and the output member 32. Each speed ratio corresponds to a respective transmission 'range' or 'gear'. Each speed ratio corresponds with a respective 'range' in the first column of FIG. 2 and a corresponding torque ratio shown in the second column of FIG. 2, as is understood by those skilled in the art.

Transmission input member 28 is torsionally coupled for common rotation with transmission main shaft 34. In various embodiments, input member 28 and main shaft 34 may be one member rather than two separate members as shown and described herein. It is to be understood herein that wherever reference is made to main shaft 34, the reference may alternately be replaced with input member 28.

The transmission further includes a first countershaft 36 and a second countershaft 38, both spaced apart from the main shaft 34 and aligned substantially parallel with the main shaft 34. The main shaft 34 has gear 40 secured to main shaft 34 for common rotation therewith. Gear 40 intermeshes with gear 42 which is secured to the first countershaft 36 for common rotation with the first countershaft 36. Gear 40 and gear 42 form a first coplanar, intermeshing gear set, as indicated by plane P1. Gears 40 and 42 may also be referred to as a first head gear set which is configured for transferring rotary motion and torque from the main shaft 34 to the first countershaft 36.

Gear 44 is secured to main shaft 34 for common rotation with main shaft 34. Gear 44 continuously intermeshes with gear 46 which is secured for common rotation with the second countershaft 38. Gear 44 and gear 46 form a second coplanar, intermeshing gear set, as indicated by plane P2. Gears 44 and 46 may also be referred to as a second head gear set which is configured for transferring rotary motion and torque from the main shaft 34 to the second countershaft 38.

Sleeve shaft 48 is concentric with and rotatable about main shaft 34. Sleeve shaft 48 has one end portion that rides in and is supported by bearings 52 secured to a side portion of gear 44. Sleeve shaft 48 is free to rotate in bearings 52 relative to gear 44. A hub portion 50 is secured to an opposing end portion of sleeve shaft 48.

Sleeve shaft 60 is concentric with and rotatable about first countershaft 36. Gear 54 is secured to sleeve shaft 60 for common rotation with sleeve shaft 60. Gear 54 continuously intermeshes with gear 56 which is concentric with and secured to sleeve shaft 48 for common rotation with sleeve shaft 48.

Sleeve shaft 62 is concentric with and rotatable about second countershaft 38. Gear 58 is secured to sleeve shaft 62 for common rotation with sleeve shaft 62. Gear 58 continuously intermeshes with gear 56. Gears 54, 56 and 58 form a third coplanar, intermeshing gear set, as indicated by plane P3.

Sleeve shaft 64 is concentric with and rotatable about first countershaft 36. Gear 68 is secured to sleeve shaft 64 for common rotation with sleeve shaft 64. Gear 68 continuously intermeshes with gear 70 which is concentric with and secured to sleeve shaft 48 for common rotation with sleeve shaft 48. Sleeve shaft 66 is concentric with and rotatable about second countershaft 38. Gear 72 is secured to sleeve shaft 66 for common rotation with sleeve shaft 66. Gear 72 continuously intermeshes with gear 70 which is concentric with and secured to sleeve shaft 48 for common rotation with sleeve shaft 48. It should be noted that sleeve shafts 60 and 64 are not interconnected and are free to rotate independently about first countershaft 36. Similarly, sleeve shafts 62 and 66 are not interconnected and are free to rotate independently about second countershaft 38. Gear 68, gear 70 and gear 72 form a fourth coplanar, intermeshing gear set, as indicated by plane P4.

A torque transmitting mechanism CD, which is a dog clutch, is concentric with and supported for rotation about the first countershaft 36. A dog clutch is a type of clutch which couples two rotating shafts or other rotating components not by friction but by mechanical interference. Various types of dog clutches are known to those skilled in the art. The dog clutch CD has three positions or states: forward, reverse and neutral. In certain embodiments the dog clutch can be in the forward or the reverse position at any given time, the neutral position being a momentary/transitory position enabling the dog clutch to first disengage one state before engaging another state. In other embodiments the dog clutch can be selectively placed into any of the states: forward, neutral and reverse. The position or state of the dog clutch CD is selected by an independent actuator (not shown) such as but not limited to a hydraulic control system or an electric solenoid actuator to move the dog clutch CD to either the reverse (left) or forward (right) positions. When selectively placed into the reverse position, the dog clutch CD engages and torsionally couples gear 74 for common rotation with the sleeve shaft 78 partially establishing a first reverse speed ratio as indicated in the column labeled CD in FIG. 2. Sleeve shaft 78 is concentric with and rotatable about the first countershaft 36. Gear 74 continuously intermeshes with gear 76. Gear 76 is concentric with and continuously coupled for common rotation with gear 80. Gear 80 continuously intermeshes with gear 56 which is secured to and supported by sleeve shaft 48.

When selectively placed into the forward position, the dog clutch CD engages and torsionally couples sleeve shaft 64 for common rotation with sleeve shaft 78, partially establishing a forward speed ratio as indicated in the column labeled CD in FIG. 2.

The transmission 14 further includes a planetary gear set 82. The planetary gear set includes a sun gear member 84, a ring gear member 88 and a carrier member 90 which rotatably supports a plurality of pinion gears 86. The pinion gears 86 continuously intermesh with both the ring gear member 88 and the sun gear member 84. The carrier member 90 is continuously coupled for common rotation with transmission output member 32.

It should be understood that the main shaft 34, and the countershafts 36, 38 are aligned in a spaced parallel fashion in a generally triangular formation arranged in spaced proximity so that gears on the main shaft 34 and its concentric sleeve shaft 48 may intermesh with gears on the countershafts 36, 38 and their sleeve shafts 60, 62, 64, 66.

The transmission 14 includes seven torque transmitting mechanisms in addition to the dog clutch CD discussed earlier. The torque transmitting mechanisms and dog clutch are selectively engageable according to an engagement schedule in the truth table of FIG. 2 to establish nine forward speed ratios and two reverse speed ratios between the transmission input member 28 and the transmission output member 32. The seven additional torque transmitting mechanisms are C1, C2, C3, C4, C5, C6 and C7. An optional tenth forward speed ratio may be established by engaging torque transmitting members C4 and C6 (this optional tenth speed is not presented in the engagement schedule or truth table of FIG. 2).

C1 is a rotary clutch selectively engageable to torsionally couple sleeve shaft 62 and gear 58 for common rotation with the second countershaft 38. C2 is a rotary clutch selectively engageable to torsionally couple sleeve shaft 62 and gear 72 for common rotation with the second countershaft 38. C3 is a rotary clutch selectively engageable to torsionally couple sleeve shaft 78 for common rotation with the first countershaft 36. C4 is a rotary clutch selectively engageable for torsionally coupling main shaft 34 for common rotation with sun gear member 84, thus bypassing countershafts 36 and 38. C5 is a rotary clutch selectively engageable to torsionally couple sleeve shaft 64 and gear 68 for common rotation with the first countershaft 36. C6 is a brake selectively engageable to ground the ring gear member 88 to the transmission housing 24. C7 is a rotary clutch selectively engageable for torsionally coupling the ring gear member 88 for common rotation with the sleeve shaft 48. C7 may also be referred to as a lockup clutch, as engaging C7 locks the ring gear member 88 into common rotation with the sun gear member 84, thereby locking the entire planetary gear set 82 as well as the output member 32 to rotate at the same speed as the sleeve shaft 48.

On the first countershaft 36, gears 54 and 68 are supported on the span of the countershaft 36 between the support plates 96, 92. Similarly, on the second countershaft 38, gears 58 and 72 are supported on the span of the countershaft 38 between the support plates 96, 92. Rotary clutches C2 and C5 are supported in a cantilever fashion behind support plate 92 on a side of the support plate 92 opposite the span of the countershafts 36, 38.

Referring now to FIG. 2, the engagement schedule or truth table of the torque transmitting mechanisms C1, C2, C3, C4, C5, C6, C7 and CD is presented for achieving the nine forward speed ratios and two reverse speed ratios. Although the engagement schedule presented in FIG. 2 identifies nine forward speed ratios, the transmission 14 is optionally capable of achieving ten forward speed ratios where the missing tenth speed ratio is enabled by engaging torque transmitting mechanisms C4 and C6 with the dog clutch CD in either the forward or reverse position, as discussed earlier. C7 is applied in transmission ranges 5 through 9 to lock-up the planetary gear set 82 by coupling gears 56, 70 via the sleeve shaft 48 and hub member 50 to both the sun gear member 84 and the ring gear member 88, effectively locking the rotation speed of the output member 32 to the rotation speed of the sleeve shaft 48. As those skilled in the art will understand, whenever any two members of a planetary gear set are coupled for common rotation, all members of the planetary gear set rotate at the same speed.

When the brake C6 is engaged, the torque transmitting mechanisms C1, C2, C3, C4 and C5 may be individually applied to provide the first four forward speed ratios of ranges 1 through 4 as presented in FIG. 2. In the case of range 3, in addition to having C3 engaged the dog clutch CD must be in the forward position. The position of the dog clutch CD is of no relevance in forward ranges 1, 2 and 4.

When torque transmitting mechanism C7 is engaged to lock-up the planetary gear set 82, the torque transmitting mechanisms C1, C2, C3, C4, and C5 may be individually applied to provide five forward speed ratios as indicated in ranges 5 through 9 as presented in FIG. 2. In the case of range 7, in addition to having C3 engaged, the dog clutch CD must be in the forward position. The position of the dog clutch CD is of no relevance in forward ranges 5, 6, 8 and 9.

As indicated in FIG. 2, a relatively high total ratio coverage (TRC) of 8.777 is achieved between the input member 28 and the output member 32, without including any torque ratio boosting effects of the torque converter 16. A high torque ratio of 7.464 is achieved in range 1 thus providing adequate torque for vehicle take-off. The ratio steps are small enough to enable lockup of the torque converter 16 (by engaging the lock-up clutch 30) during low range (range 1) and to utilizes torque converter lock-up shifts to higher ranges which significantly reduces fuel consumption and decreases transmission cooling demand.

The torque ratios presented in FIG. 2 are achieved using the following gear tooth counts. In the first head set, gear 40 has 57 teeth; gear 42 has 55 teeth. In the second head set, gear 44 has 41 teeth and gear 46 has 59 teeth. In the reverse gear set, gear 74 has 46 teeth and gear 76 has 46 teeth; gear 80 has 26 teeth and gear 56 has 59 teeth. For the remaining gears in concentric rotation about the countershafts 36, 38 or main shaft 34, gear 54 has 50 teeth; gear 56 has 59 teeth; gear 58 has 39 teeth; gear 68 has 59 teeth; gear 70 has 52 teeth and gear 72 has 48 teeth. In the planetary gear set 82, the sun gear 84 has 35 teeth and the ring gear 88 has 85 teeth.

Forward range 1 is achieved by engaging clutches C1 and C6, transmitting power along the coupled path: input member 28, main shaft 34, gear 44 intermeshed to gear 46, second countershaft 38, rotary clutch C1, sleeve shaft 62, gear 58 intermeshed to gear 56, sleeve shaft 48, hub member 50, sun gear member 84, pinion gears 86 and carrier member 90 through to output member 32. Clutch C6 grounds the ring gear member 88 to provide a reaction point to the planetary gear set 82.

Forward range 2 is achieved by engaging clutches C2 and C6, transmitting power along the coupled path: input member 28, main shaft 34, gear 44 intermeshed to gear 46, second countershaft 38, rotary clutch C2, sleeve shaft 66, gear 72 intermeshed to gear 70, sleeve shaft 48, hub member 50, sun gear member 84, pinion gears 86 and carrier member 90 through to output member 32. Clutch C6 grounds the ring gear member 88 to provide a reaction point to the planetary gear set 82.

Forward range 3 is achieved by engaging clutches C3 and C6 with the dog clutch CD in the forward position, transmitting power along the coupled path: input member 28, main shaft 34, gear 40 intermeshed to gear 42, first countershaft 36, rotary clutch C3, sleeve shaft 78, dog clutch CD selectively engaging sleeve shaft 60, gear 54 intermeshed to gear 56, sleeve shaft 48, hub member 50, sun gear member 84, pinion gears 86 and carrier member 90 through to output member 32. Clutch C6 grounds the ring gear member 88 to provide a reaction point to the planetary gear set 82.

Forward range 4 is achieved by engaging clutches C5 and C6, transmitting power along the coupled path: input member 28, main shaft 34, gear 40 intermeshed to gear 42, first countershaft 36, rotary clutch C5, sleeve shaft 64, gear 68 intermeshed to gear 70, sleeve shaft 48, hub member 50, sun gear member 84, pinion gears 86 and carrier member 90 through to output member 32. Clutch C6 grounds the ring gear member 88 to provide a reaction point to the planetary gear set 82.

Forward range 5 is achieved by engaging clutches C1 and C7, transmitting power along the coupled path: input member 28, main shaft 34, gear 44 intermeshed to gear 46, second countershaft 38, rotary clutch C1, sleeve shaft 62, gear 58 intermeshed to gear 56, sleeve shaft 48, hub member 50, sun gear member 84, pinion gears 86 and carrier member 90 through to output member 32. Clutch C7 is a lock-up clutch, locking the ring gear member 88 into common rotation with the sun gear member 84, thereby locking the rotation speed of the output member 32 to the rotation speed of the sleeve shaft 48 and hub member 50.

Forward range 6 is achieved by engaging clutches C2 and C7, transmitting power along the coupled path: input member 28, main shaft 34, gear 44 intermeshed to gear 46, second countershaft 38, rotary clutch C2, sleeve shaft 66, gear 72 intermeshed to gear 70, sleeve shaft 48, hub member 50, sun gear member 84, pinion gears 86 and carrier member 90 through to output member 32. Clutch C7 is a lock-up clutch, locking the ring gear member 88 into common rotation with the sun gear member 84, thereby locking the rotation speed of the output member 32 to the rotation speed of the sleeve shaft 48 and hub member 50.

Forward range 7 is achieved by engaging clutches C3 and C7 with the dog clutch CD in the forward position, transmitting power along the coupled path: input member 28, main shaft 34, gear 40 intermeshed to gear 42, first countershaft 36, rotary clutch C3, sleeve shaft 78, dog clutch CD selectively engaging sleeve shaft 60, gear 54 intermeshed to gear 56, sleeve shaft 48, hub member 50, sun gear member 84, pinion gears 86 and carrier member 90 through to output member 32. Clutch C7 is a lock-up clutch, locking the ring gear member 88 into common rotation with the sun gear member 84, thereby locking the rotation speed of the output member 32 to the rotation speed of the sleeve shaft 48 and hub member 50.

Forward range 8 is achieved by engaging clutches C4 and C7, transmitting power along the coupled path: input member 28, main shaft 34, rotary clutch C4, sun gear member 84, pinion gears 86 and carrier member 90 through to output member 32. Clutch C7 is a lock-up clutch, locking the ring gear member 88 into common rotation with the sun gear member 84, thereby locking the rotation speed of the output member 32 to the rotation speed of the main shaft 34. In range 8, the countershafts 36, 38 and their associated clutches and gearing is bypassed by selectively coupling main shaft 34 to the sun gear member 84 and ring gear member 88 through engaged clutches C4 and C7.

Forward range 9 is achieved by engaging clutches C5 and C7, transmitting power along the coupled path: input member 28, main shaft 34, gear 40 intermeshed to gear 42, first countershaft 36, rotary clutch C5, sleeve shaft 64, gear 68 intermeshed to gear 70, sleeve shaft 48, hub member 50, sun gear member 84, pinion gears 86 and carrier member 90 through to output member 32. Clutch C7 is a lock-up clutch, locking the ring gear member 88 into common rotation with the sun gear member 84, thereby locking the rotation speed of the output member 32 to the rotation speed of the sleeve shaft 48 and hub member 50.

Reverse range Rev L is achieved by engaging clutches C3 and C6 with the dog clutch CD in the reverse position, transmitting power along the coupled path: input member 28, main shaft 34, gear 40 intermeshed to gear 42, first countershaft 36, rotary clutch C3, sleeve shaft 78, dog clutch CD selectively engaging gear 74 intermeshed to gear 76, gear 76 coupled to gear 80 intermeshed to gear 56, sleeve shaft 48, hub member 50, sun gear member 84, pinion gears 86 and carrier member 90 through to output member 32. Clutch C6 grounds the ring gear member 88 to provide a reaction point to the planetary gear set 82. Gears 74, 76 and 80 may be referred to herein as the reverse gear train as these gears are selectively driven through the dog clutch to at least partially establish one of the two reverse gear ranges.

Reverse range Rev H is achieved by engaging clutches C3 and C7 with the dog clutch CD in the reverse position, transmitting power along the coupled path: input member 28, main shaft 34, gear 40 intermeshed to gear 42, first countershaft 36, rotary clutch C3, sleeve shaft 78, dog clutch CD selectively engaging gear 74 intermeshed to gear 76, gear 76 coupled to gear 80 intermeshed to gear 56, sleeve shaft 48, hub member 50, sun gear member 84, pinion gears 86 and carrier member 90 through to output member 32. Clutch C7 is a lock-up clutch, locking the ring gear member 88 into common rotation with the sun gear member 84, thereby locking the rotation speed of the output member 32 to the rotation speed of the sleeve shaft 48 and hub member 50.

Figure 4:
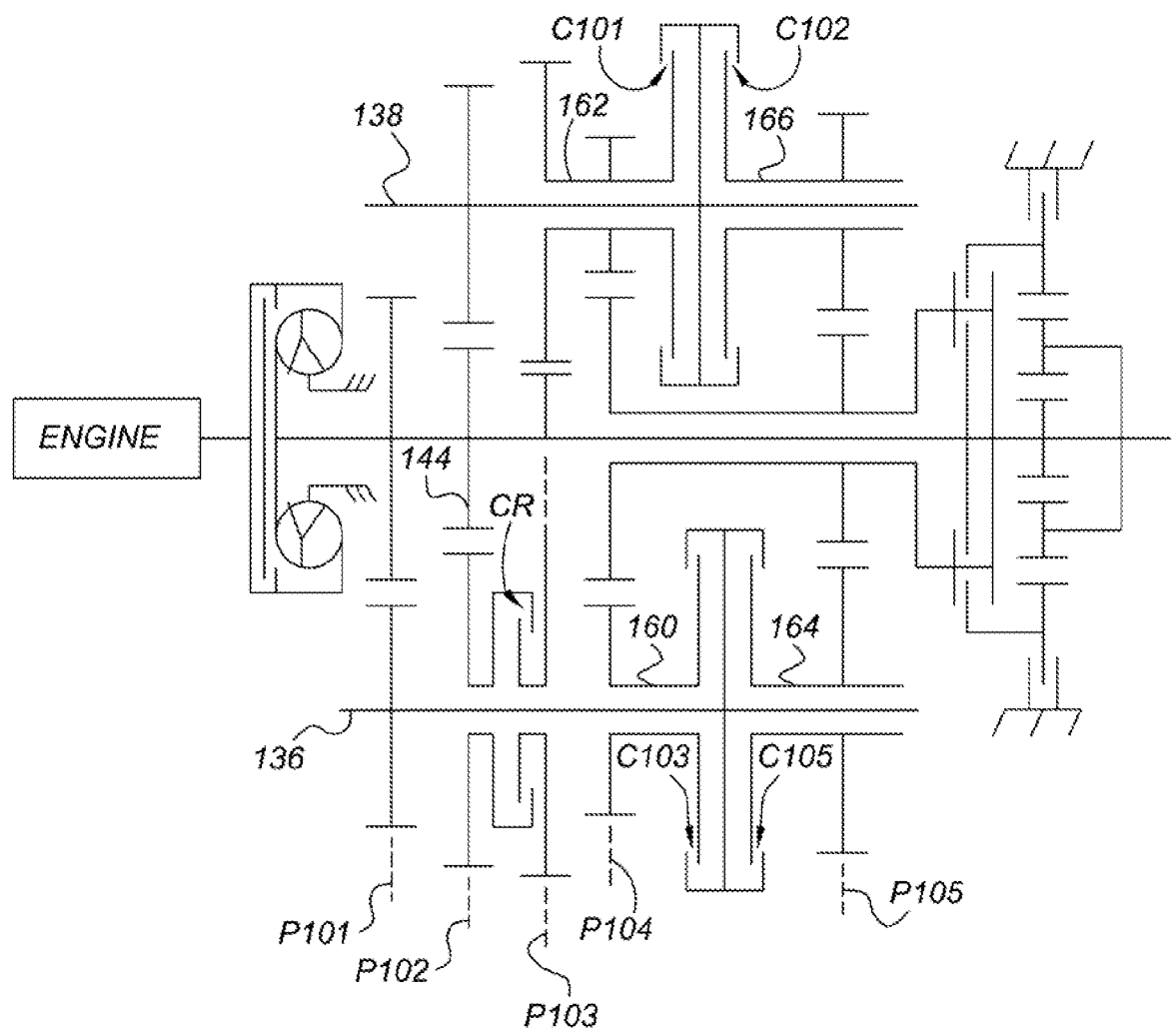
FIG. 4 illustrates a transmission not within the scope of the invention having nine forward ranges and two reverse ranges, for comparison and discussion of differences and benefits described herein.

The discussion is now directed to FIG. 1 together with FIG. 4. FIG. 4 illustrates a transmission not within the scope of the invention having nine forward ranges and two reverse ranges for comparison to and discussions of features of transmissions of the present invention as presented herein. In discussions herein and for ready cross reference, reference numbers in FIG. 4 correspond to reference numbers provided in FIG. 1 with one hundred added. In FIG. 4, torque transmitting mechanisms C 101 and C 102, are coupled to sleeve shafts 162 and 166 respectively which are concentric with, supported by and rotate about countershaft 138. Similarly, torque transmitting mechanisms C 103 and C 105 are coupled to sleeve shafts 160 and 164 respectively that are concentric with, supported by and rotate about countershaft 136. In the present invention illustrated in FIG. 1, clutches C1 and C2 are now split and positioned nearer to opposing ends of the countershaft 38. Similarly, clutches C3 and C5 are now split and positioned nearer to opposing ends of the countershaft 36. In FIG. 1 clutches C2 and C5 (corresponding to C 102 and C 105 in FIG. 4) are moved behind (to the right of) support plate 92, where they are moved off the countershafts 36, 38 (corresponding to 136,138 in FIG. 4), thus allowing a reduction in the span (or distance between) the bearings 94 at the front of the transmission housing and the bearings 93 at the rear support plate of the transmission housing. The bearings 93, 94 can be any of, but are not limited to, ball bearings, roller bearings or tapered bearings. Reducing this span permits reduction of the countershafts 36, 38 in both diameter and length, resulting in a more compact transmission 14 and reducing material costs.

The transmission of FIG. 4 utilizes five countershaft gear planes P 101, P 102, P 103, P 104 and P 105 to implement nine forward ranges. In contrast, the transmission embodiment of the present invention depicted in FIG. 1 achieves nine forward ranges using only four countershaft gear planes P1, P2, P3 and P4, reducing parts complexity, cost and permitting further reduction in the span between the bearings 94, 93 and required size of countershafts 36, 38, again resulting in a more compact transmission 14. The reverse gears 74 and 76 shown in FIG. 1 can be considered as a fifth gear plane.

In the transmission of FIG. 4, the reverse ranges are partially enabled by the reverse rotary clutch CR (see FIG. 4) concentric with and rotating about the countershaft 136. In the present invention illustrated in FIG. 1 the reverse rotary clutch CR of FIG. 4 has been replaced with a dog clutch CD. Use of the dog clutch CD permits moving rotary clutch C103 (see FIG. 4) to be tucked under input gear 44 (144 in FIG. 4) into what would otherwise be dead space, permitting the countershaft 36 to be shortened and again resulting in a more compact transmission 14.

Figure 3:
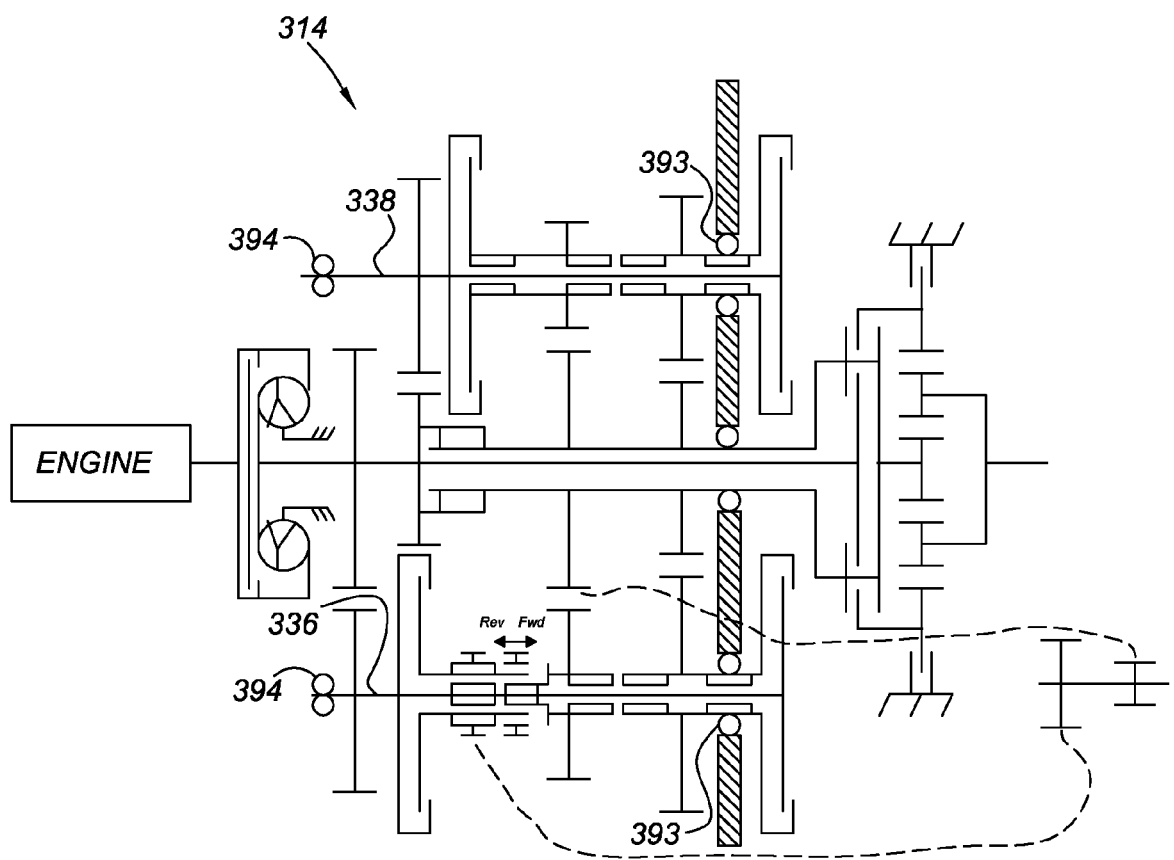
FIG. 3 illustrates an alternate embodiment of the transmission presented in FIG. 1 in which further advantage is taken of the reduced length of the transmission of FIG. 1 to allow removal of the support plate, thereby further reducing parts complexity and overall length of the transmission.

FIG. 3 illustrates an alternate transmission embodiment 314 of the transmission 14 illustrated in FIG. 1 in which further advantage is taken of the reduced length of the transmission 14 of FIG. 1. In the transmission 314, an additional reduction in distance between the countershaft bearings 393 and 394 (relative to the distance between countershaft bearings 93 and 94 of FIG. 1) is achieved by the removal of the support plate 96 (See FIG. 1). This permits the first countershaft 336 and second countershaft 338 to be reduced in length, thereby further reducing parts complexity, material and overall length of the transmission.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
    an input member;
    an output member;
    first and second countershafts arranged generally parallel to said input and output members;
    a plurality of torque transmitting mechanisms consisting of:
        a first and a second rotary clutch spaced apart from one another on said first countershaft;
        a third and a fourth rotary clutch spaced apart from one another on said second countershaft;
        a dog clutch; and
        three additional torque transmitting mechanisms;
    a plurality of intermeshing gears arranged on said input member, said first countershaft and said second countershaft to define five gear planes; and
    a planetary gear set operatively connecting said input member and said countershafts with said output member via selected ones of said torque transmitting mechanisms;
    wherein said rotary clutches, torque transmitting mechanisms and dog clutch are selectively engageable in different combinations to establish at least nine forward speed ratios and at least one reverse speed ratio between said input member and said output member, said forward ratios utilizing gears in only four of said five gear planes.

2. The transmission of claim 1, wherein
    each countershaft is rotatably supported by bearings at opposing ends, each countershaft having a span between said bearings supporting said intermeshing gears arranged on said countershaft;
    wherein each countershaft has at least one of its rotary clutches supported in a cantilevered fashion by one of said bearings spaced apart from said span of said countershaft; and
    wherein said span of each countershaft supports no more than one rotary clutch.

3. The transmission of claim 2, wherein
    said transmission is characterized by no more than one support plate supporting said countershafts.

4. The transmission of claim 1, wherein
    said plurality of intermeshing gears includes
        a first head gear set of coplanar intermeshing gears for transferring torque from said input member to said first countershaft; wherein said first head gear set has one gear concentric with and driveably coupled to said first countershaft; wherein said first head gear set has a different gear concentric with and driveably coupled to said input member; and
        a second head gear set of coplanar intermeshing gears for transferring torque from said input member to said second countershaft; wherein said second head gear set has one gear concentric with and driveably coupled to said second countershaft; wherein said second head gear set has a different gear concentric with and driveably coupled to said input member.

5. The transmission of claim 4, wherein
    said first countershaft has three countershaft gears select from said plurality of intermeshing gears, said three countershaft gears concentric with and rotatable about said first countershaft;
    wherein said dog clutch is concentric with and supported for rotation about said first countershaft, said dog clutch selectively moveable between opposing forward and reverse positions; said dog clutch selectively driveably coupling said first rotary clutch to one of said three first countershaft gears when said dog clutch is in said forward position to at least partially enable at least one of said forward speed ratios;
    wherein said second rotary clutch is selectively engageable to driveably couple said first countershaft to a different one of said three first countershaft gears to at least partially enable at least one forward speed ratio;

wherein a different one of said three first countershaft gears is a first reverse gear concentric with and rotatable about said first countershaft; and wherein said reverse position of said dog clutch driveably couples said first rotary clutch to said first reverse gear to at least partially enable at least one reverse speed ratio.

6. The transmission of claim 4, wherein
one of said rotary clutches and one of said head gear sets define one of said gear planes.

7. The transmission of claim 5, wherein
said second countershaft has two of said plurality of intermeshing gears concentric with and rotatable about said second countershaft;

wherein said third rotary clutch is selectively engageable to driveably couple said second countershaft to one of said two second countershaft gears to at least partially enable at least one forward speed ratio; and wherein said fourth rotary clutch is selectively engageable to driveably couple said second countershaft to a different one of said two second countershaft gears to at least partially enable at least one forward speed ratio.

8. The transmission of claim 5, wherein said reverse gear train comprises:
said first reverse gear;
a second reverse gear continuously meshably engaging said first reverse gear; and
a third reverse gear continuously and non-meshably coupled for common rotation with said second reverse gear, said third reverse gear continuously meshably engaging a portion of a fourth gear, said fourth gear concentric with and rotatable about said input member and driveably coupled to at least partially enable at least one reverse speed ratio;
wherein said first and second reverse gears at least partially define one of said five gear planes.

9. The transmission of claim 1, wherein
one of said three additional torque transmitting mechanisms is a bypass torque transmitting mechanism selectively engageable to transfer torque directly from said input member to said planetary gear set, thereby bypassing said countershafts.

10. The transmission of claim 1, wherein said planetary gear set includes a ring gear member, a carrier member and a sun gear member; and wherein one of said three additional torque transmitting mechanisms is a brake clutch selectively engageable to ground said ring gear member providing a reaction point to said planetary gear set.

11. The transmission of claim 1, wherein
one of said three additional torque transmitting mechanisms is a lock-up clutch selectively engageable to torsionally couple for common rotation two of said members of said planetary gear set.

12. A transmission comprising:
an input member;
an output member;
first and second countershafts arranged generally parallel to said input and output members;
a plurality of torque transmitting mechanisms consisting of:
  a first and a second rotary clutch on said first countershaft;
  a third and a fourth rotary clutch on said second countershaft;
  a dog clutch; and
  three additional torque transmitting mechanisms;
a plurality of intermeshing gears arranged on said input member, said first countershaft and said second countershaft forming a plurality of gear planes, wherein one of the rotary clutches and one head gear set define one of said gear planes;

a planetary gear set operatively connecting said input member and said countershafts with said output member via selected ones of said torque transmitting mechanisms;

wherein at least one countershaft has its rotary clutches split apart from one another; and wherein said rotary clutches, torque transmitting mechanisms and dog clutch are selectively engageable in different combinations to establish at least nine forward speed ratios and at least one reverse speed ratio between said input member and said output member, said forward ratios utilizing gears in only four of said five gear planes.

13. The transmission of claim 12, wherein
each countershaft has opposing ends rotatably supported by bearings, said countershafts having a span between said bearings supporting said intermeshing gears arranged on said countershaft; and wherein each countershaft has at least one of its rotary clutches supported in a cantilevered fashion by one of said bearings away from said span of said countershaft.

14. The transmission of claim 13, wherein said transmission is characterized by no more than one support plate supporting at least one of said countershafts.

15. The transmission of claim 12, wherein
said plurality of intermeshing gears includes
  a first head gear set of coplanar intermeshing gears for transferring torque from said input member to said first countershaft; wherein said first head gear set has one gear concentric with and driveably coupled to said first countershaft; wherein said first head gear set has a different gear concentric with and driveably coupled to said input member; and
  a second head gear set of coplanar intermeshing gears for transferring torque from said input member to said second countershaft; wherein said second head gear set has one gear concentric with and driveably coupled to said second countershaft; wherein said second head gear set has a different gear concentric with and driveably coupled to said input member.

16. The transmission of claim 15, wherein
said first countershaft has three first countershaft gears selected from said plurality of intermeshing gears, said three first countershaft gears concentric with and rotatable about said first countershaft;

said dog clutch is concentric with and supported for rotation about said first countershaft, said dog clutch selectively moveable between opposing forward and reverse positions; said dog clutch selectively driveably coupling said first rotary clutch to one of said three first countershaft gears when said dog clutch is in said forward position to at least partially enable at least one forward speed ratio;

wherein said second rotary clutch is selectively engageable to driveably couple said first countershaft to a different one of said three first countershaft gears to at least partially enable at least one forward speed ratio;

wherein a different one of said three first countershaft gears is a first reverse gear concentric with and rotatable about said first countershaft; and wherein said reverse position of said dog clutch driveably couples said first rotary clutch to said first reverse gear to at least partially enable at least one reverse speed ratio.

17. The transmission of claim 16, wherein said reverse gear train comprises:
   said first reverse gear;
   a second reverse gear continuously meshably engaging said first reverse gear; and
   a third reverse gear continuously and non-meshably coupled for common rotation with said second reverse gear, said third reverse gear continuously meshably engaging a portion of a fourth gear, said fourth gear concentric with and rotatable about said input member and driveably coupled to at least partially enable at least one reverse speed ratio.

18. A transmission comprising:
   an input member;
   an output member;
   first and second countershafts positioned in a generally parallel arrangement;
   a plurality of torque transmitting mechanisms consisting of:
      a first and second rotary clutch spaced apart from one another on said first countershaft;
      a third and fourth rotary clutch spaced apart from one another on said second countershaft;
      a dog clutch; and
      three additional torque transmitting mechanisms;
   a plurality of intermeshing gears arranged on said input member said first countershaft and said second countershaft forming a plurality of gear planes, wherein said plurality of intermeshing gears include:
      a first head gear set of coplanar intermeshing gears for transferring torque from said input member to said first countershaft; wherein said first head gear set has one gear concentric with and driveably coupled to said first countershaft; wherein said first head gear set has a different gear concentric with and driveably coupled to said input member;
      a second head gear set of coplanar intermeshing gears for transferring torque from said input member to said second countershaft; wherein said second head gear set has one gear concentric with and driveably coupled to said second countershaft; wherein said second head gear set has a different gear concentric with and driveably coupled to said input member;
   wherein one of the rotary clutches and one of the head gear sets defines one of said gear planes;
   a planetary gear set operatively connecting said input member and said countershafts with said output member via selected ones of the torque transmitting mechanisms;
   wherein at least one of said rotary clutches is supported in a cantilever fashion by a support plate separating a span of at least one of said countershafts from said cantilevered rotary clutch; and
   wherein said rotary clutches, torque transmitting mechanisms and dog clutch are selectively engageable in different combinations to establish at least nine forward speed ratios and at least one reverse speed ratio between said input member and said output member.

19. The transmission of claim 18, wherein
   each countershaft has one rotary clutch supported in a cantilever fashion by a support plate separating a span of said countershaft from said cantilevered rotary clutch.

20. The transmission of claim 19, wherein
   said first countershaft has three of said plurality of intermeshing gears concentric with and rotatable about said first countershaft;
   said dog clutch is concentric with and supported for rotation about said first countershaft, said dog clutch selectively moveable between opposing forward and reverse positions; said dog clutch selectively driveably coupling said first rotary clutch to one of said three first countershaft gears when said dog clutch is in said forward position to at least partially enable at least one forward speed ratio;
   wherein a different one of said three first countershaft gears is a first reverse gear concentric with and rotatable about said first countershaft;
   wherein said reverse position of said dog clutch driveably couples said first rotary clutch to said first reverse gear to at least partially enable at least one reverse speed ratio.

* * * * *